United States Patent [19]
Hasegawa et al.

[11] Patent Number: 5,511,436
[45] Date of Patent: Apr. 30, 1996

[54] VEHICLE TRANSMISSION ASSEMBLY

[75] Inventors: Toshiyuki Hasegawa, Ashiya; Koji Irikura, Kobe; Masaru Iida, Itami, all of Japan

[73] Assignee: Kanzaki Kokyukoki Mfg. Co., Ltd., Amagasaki, Japan

[21] Appl. No.: 152,464

[22] Filed: Nov. 12, 1993

[30] Foreign Application Priority Data

Dec. 18, 1992 [JP] Japan .................. 4-091988 U

[51] Int. Cl.$^6$ ............................. B60K 17/08; B60K 17/02
[52] U.S. Cl. ........................................................ 74/331
[58] Field of Search ....................... 74/331, 15.4, 15.66; 192/89.26, 70.27, 4 A, 4 C

[56] References Cited

U.S. PATENT DOCUMENTS

| | | | |
|---|---|---|---|
| 1,910,084 | 5/1933 | Bixby | 192/89.26 |
| 2,399,886 | 5/1946 | Odevseff | 192/89.26 |
| 2,760,615 | 8/1956 | Kershner | 74/15.66 |
| 3,916,714 | 11/1975 | Sisson et al. | 74/331 |
| 4,570,503 | 2/1986 | Theobold | 74/331 |
| 4,579,183 | 4/1986 | Irikura et al. | 180/53.1 |
| 4,589,295 | 5/1986 | Jerry et al. | 74/331 |
| 4,598,599 | 7/1986 | Ikemoto | 74/339 |

FOREIGN PATENT DOCUMENTS 63-179239  11/1988  Japan .

Primary Examiner—Dirk Wright

[57] ABSTRACT

A transmission assembly adapted to be mounted on a front of a vehicle axle casing as a substitute for a hydrostatic transmission comprises a transmission casing (1) and a drive shaft (2) at a high level, a speed-change shaft (4) at a low level, and an intermediate shaft (3) at a level intermediate between the drive and change shafts. These shafts extend within the transmission casing axially of this casing. The intermediate shaft is located aside in a direction across the casing. A clutch (5) is disposed on the drive shaft at an axial mid portion of this shaft, and a hollow shaft (6) which is driven to rotate by the drive shaft through the clutch is disposed on the drive shaft at one axial side of the clutch. A first mechanical speed-change mechanism (7) is disposed between the hollow shaft and intermediate shaft, whereas a second mechanical speed-change mechanism is disposed between the intermediate shaft and change shaft. Configuration of the transmission casing may be simplified, while the number of change ratios obtainable is greatly increased.

8 Claims, 9 Drawing Sheets

VEHICLE TRANSMISSION ASSEMBLY

FIELD OF THE INVENTION

This invention relates to a transmission assembly adapted for use in a vehicle transmission for relatively small-scaled working vehicles, such as mower tractors, in place of a hydrostatic transmission assembly.

BACKGROUND OF THE INVENTION

As a transmission for small-scaled working vehicles, there is known from U.S. Pat. No. 4,579,183 a transmission in which power take-off shafts for taking-off auxiliary implement-driving power are journalled in an axle casing having left and right rear wheel axles and in which a hydrostatic transmission assembly operable to change the vehicle travel speed non-stepwisely is mounted on a front of the axle casing such that a space is provided before the casing at a location below the hydrostatic transmission. The hydrostatic transmission assembly includes a displacement-variable hydraulic pump of a higher level and a displacement-fixed hydraulic motor of a lower level. Motor shaft of the hydraulic motor is used for transmitting vehicle-driving power to a mechanical transmission mechanism disposed within the axle casing for driving the wheel axles, while pump shaft is used for transmitting auxiliary implement-driving power to a transmission mechanism disposed within the axle casing for driving the power take-off shafts. In this transmission, the hydrostatic transmission which may be small-sized provides the space, set forth above, before a lower portion of the axle casing, so that such space is used for projecting a front wheel-driving shaft and mid-PTO (power take-off) shaft forwardly from an inside of the axle casing.

As shown in 3P, U No. 63-179239, there is known a vehicle transmission in which a transmission assembly comprising a mechanical speed-change mechanism is mounted, in place of the hydrostatic transmission assembly set forth above, on a front of an axle casing within which both of the transmission mechanisms for driving wheel axles and for driving power take-off shafts are disposed. That is, though a mechanical speed-change mechanism is disadvantageous due to its stepwise speed-change operation as compared to a hydrostatic transmission capable of non-stepwise speed-change operation, such mechanical speed-change mechanism is superior to a hydrostatic transmission in energy efficiency and in cost so that it is required or at least desirable in some vehicle transmissions to employ such transmission assembly comprising a mechanical speed-change mechanism.

In the transmission assembly disclosed in JP, U No. 63-179239 referred to above, a drive shaft is disposed at a high level within a transmission casing, which is to be mounted on a front of an axle casing, and extends forwardly and rearwardly from the transmission casing so that the drive shaft takes a position corresponding to that of the pump shaft of a hydrostatic transmission assembly which is to be mounted also on a front of an axle casing. A speed-change shaft which corresponds to the motor shaft of the hydrostatic transmission assembly is disposed at a low level within the transmission casing and extends rearwardly from the transmission casing. For the purpose of providing a mechanical speed-change mechanism with keeping the vertical interval between the drive shaft and speed-change shaft equal to the vertical interval between the pump shaft and motor shaft of the hydrostatic transmission assembly, an intermediate shaft is disposed within the transmission casing at an intermediate level between the drive shaft and speed-change shaft such that it is located aside in a direction across the transmission casing and the mechanical speed-change mechanism is disposed between the intermediate shaft and speed-change shaft. A clutch which is required for a shifting operation of the mechanical speed-change mechanism is disposed within a clutch housing which is formed integral with a front end cover of the transmission casing such that the housing projects forwardly of the cover. It is fashioned that power is transmitted from the clutch to the intermediate shaft through a hollow shaft, which is rotatably mounted on the drive shaft and extends through the front end cover, and through a gear mechanism. Shift members of the mechanical speed-change mechanism are disposed on the speed-change shaft, and shifter forks for shifting the shift members are supported by support shafts disposed at an uppermost level within the transmission casing and extend downwardly at one side of the intermediate shaft so that they engage at their lower ends with the shift members.

Although the transmission assembly disclosed in JP, U No. 63-179239 and having the structure detailed above is well devised as the one which is to be used as a substitute for a hydrostatic transmission, some improvement is still required. That is, the clutch disposed within a clutch housing in the front end cover of the transmission casing will make the configuration of the transmission casing complicated as a whole so that there remains a problem in manufacturing and handling of the casing. Because this clutch is disposed on a front end portion of the drive shaft, load caused by clutch-disengaging operations and applied to the transmission casing will induce a large reaction force at the interlace between the transmission casing and axle casing. Consequently, a strain may be caused at such interface where power is transmitted from the inside of the transmission casing into the axle casing. Furthermore, the single mechanical speed-change mechanism disposed between the intermediate shaft and speed-change shaft provides relatively small number of change ratios so that it is considerably disadvantageous in speed-changing function as compared to a hydrostatic transmission performing non-stepwise changing operation.

In the transmission assembly set forth above, the drive shalt is used at the inside of the transmission casing only to transmit power rearward. The present invention aims at solving the problems set forth above by positively using such drive shaft.

Accordingly, a primary object of the present invention is to provide an improved transmission assembly in which the configuration of a transmission casing is simplified as a whole, the influence of load caused by clutch-disengaging operations is largely reduced and the number of speed-change ratios is greatly increased.

SUMMARY OF THE INVENTION

The present invention relates to a vehicle transmission assembly which comprises: a transmission casing (1); a drive shaft (2) which is disposed within the transmission casing at a high level and extends axially of the casing; a speed-change shaft (4) which is disposed within the transmission casing at a low level and extends axially of the casing; and an intermediate shaft (3) which is disposed within the transmission casing at an intermediate level between the drive shaft and speed-change shaft. The drive shaft (2) is arranged such that it extends forwardly and rearwardly from the transmission casing, and the speed-change shaft is arranged such that it extends rearwardly from the transmission casing. The intermediate shaft (3) is arranged such that it is located aside in a direction across the transmission casing.

The transmission assembly according to the present invention further comprises: a clutch (5) which is disposed on the drive shaft (2) at an axially mid portion of this shaft; a hollow shaft (6) which is rotatably mounted on the drive shaft (2) at one axial side of the clutch (5) such that it is driven to rotate by the drive shaft through the clutch; a first mechanical speed-change mechanism (7) which is disposed between the hollow shaft (6) and intermediate shaft (3); and a second mechanical speed-change mechanism (8) which is disposed between the intermediate shaft (3) and speed-change shaft (4).

Shifting operation of each of the mechanical speed-change mechanisms (7, 8) is carried out in a condition where the clutch (5) is once disengaged. The total number of speed change ratios obtainable by these first and second speed-change mechanisms which are connected in series with each other through the intermediate shaft (3) equals to the product of the number of change ratios of the first mechanism (7) and the number of change ratios of the second mechanism (8).

The arrangement of the three shafts within the transmission casing (1) that the intermediate shaft (3) which is disposed at an intermediate level between the drive shaft (2) of a high level and the speed-change shaft (4) of a low level is located aside in a direction across the transmission casing will make respective intervals between the hollow shaft (6) on the drive shaft and the intermediate shaft (3) and between the intermediate shaft (3) and the speed-change shaft (4) large enough to dispose the respective mechanical speed-change mechanisms (7, 8) between the hollow and intermediate shafts (6, 3) and between the intermediate and speed-change shafts (3, 4) with ease. Such arrangement of shafts will also avoid an undue enlargement of the vertical interval between the drive and speed-change shafts (2, 4) so that such vertical interval can be made equal to the vertical interval between the pump shaft and motor shaft of a hydrostatic transmission assembly which is mounted on a front of a vehicle axle casing, whereby the transmission assembly according to the present invention can be fashioned as a substitute for such hydrostatic transmission assembly.

In the transmission assembly according to the present invention, the drive shaft (2) is used in the transmission casing (1) not only for transmitting power rearwards but for mounting thereon a clutch (5) and also a hollow shaft (6) which is driven to rotate by the drive shaft through the clutch and acts as a transmission shaft of the driving side of the first mechanical speed-change mechanism (7). The clutch (5) disposed on an axially mid portion of the drive shaft does not interfere with members of the speed-change mechanisms (7, 8) to be disposed on the intermediate shaft (3). Because the first and second mechanical speed-change mechanisms (7, 8) are apart from each other in the axial direction or the transmission casing, there is no difficulty in providing these two change mechanisms which are connected in series with each other, as described before, so as to increase the number of speed-change ratios greatly. The clutch disposed within the transmission casing (1) contributes to simplifying the configuration of this casing. Arrangement of such clutch on an axial mid portion of the drive shaft (2) will reduce a possible reaction force induced deal at the interface between the transmission casing and a vehicle axle casing due to load caused and applied to the transmission casing during a clutch-disengaging operation, because the axial distance from the clutch to such interface is relatively small.

In a preferred embodiment of the present invention, shift means (22a) for the first mechanical speed-change mechanism (7) is disposed on the intermediate shaft (3) and shift means (25a, 26a) for the second mechanical speed-change mechanism (8) is disposed on the speed-change shaft (4). Further, shifter forks (27, 28, 29) engaging these shift means (22a, 25a, 26a) are supported respectively by support shafts (27a, 28a, 29a) which are disposed sidewards of the intermediate and speed-change shaft (3, 4) within the transmission casing (1) and extend axially of this casing.

In this arrangement, shifter forks (27, 28, 29) extend from the support shafts (27a, 28a, 29a) towards the shift means through a space where the clutch (5) on the drive shaft and gears on the intermediate and speed-change shafts provide no restriction to the arrangement of the shifter forks. In other words, the clutch and gears referred to above can be provided without being restricted by the shifter forks so that freedom in designing the transmission assembly is much heightened. The support shafts (27a, 28a, 29a) may preferably be located aside in a direction across the transmission on casing such that these support shafts are disposed opposite to the intermediate shaft (3).

The clutch (5) on the drive shaft (2) may preferably be composed to a frictional clutch comprising a first cylindrical member (9), which is mounted co-rotatably on the drive shaft (2), and a second cylindrical member (10) which is mounted co-rotatably on the hollow shaft (6). A plurality of alternately arranged first and second frictional elements (11, 12) are supported slidably but non-rotatably, respectively, by the first cylindrical member and by the second cylindrical member. One of the first and second cylindrical members (9, 10) is particularly supported slidably, and a pressure member (13) is supported by such one cylindrical member such that, when this cylindrical member is slidingly moved towards one direction, the pressure member presses the first and second frictional elements (11, 12) so as to cause a frictional engagement therebetween. Spring means (15) is provided for biasing the slidable cylindrical member to move towards the one direction, and a movable clutch-disengaging member (17) is provided for operating the slidable cylindrical member to move towards the other direction.

In the structure, the clutch (5) is kept in its engaged condition by the biasing force of spring means (15). When the clutch-disengaging member (17) is operated so as to move the slidable cylindrical member against the biasing force of spring means (15), the clutch (5) is disengaged.

The slidable mounting of one of the first and second cylindrical members (9, 10) which support a plurality of the respective frictional elements will reduce components of the clutch in number and, therefore, will contribute to reducing size of the clutch. Further, the plurality of frictional elements will provide a required capacity of the clutch in a compact fashion. It is thus seen that the clutch can be provided within the transmission casing in a space-reduced manner. The clutch-disengaging member may preferably be composed to a rockable release yoke (17) which is carried by a rotatable control shaft (16), extending through a sidewall (1b) of the transmission casing, and which is adapted to engage the slidable cylindrical member through thrust-bearing means (18).

In a further preferred embodiment of the present invention, slidable push means (18a) which is supported by the slidable cylindrical member (9) is disposed between the spring means (15) and thrust-bearing means (18) such that, when the yoke (17) is moved so as to move the slidable cylindrical member towards the clutch-disengaging direction, the thrust-bearing means pushes the spring means through the push means so as to reduce the biasing force applied to the slidable cylindrical member by the spring means. And, the thrust-bearing means (18) is disposed such that a clearance (C) exists between the thrust-bearing means (18) and slidable cylindrical member (9) at a full engaged condition of the clutch (5).

By this, when the yoke (17) is operated so as to disengage the clutch, the biasing force of spring means (15) applied to the slidable cylidrical member (9) is firstly reduced by some degree and then, when the clearance (C) has been filled up by some movement of the thrust-bearing means (18), the cylindrical member starts to be moved towards the clutch-disengaging direction. Consequently, the movement of the cylindrical member starts at a half-engaged or disengaged condition of the clutch. This contributes to reducing clutch-operating force, as will be detailed later in conjunction with FIG. 8.

BRIEF DESCRIPTION OF THE DRAWINGS

The present invention and its attendant advantages will become more readily apparent as the specification is considered in conjunction with the accompanying drawings in which.

DESCRIPTION OF PREFERRED EMBODIMENTS

Figure 2:
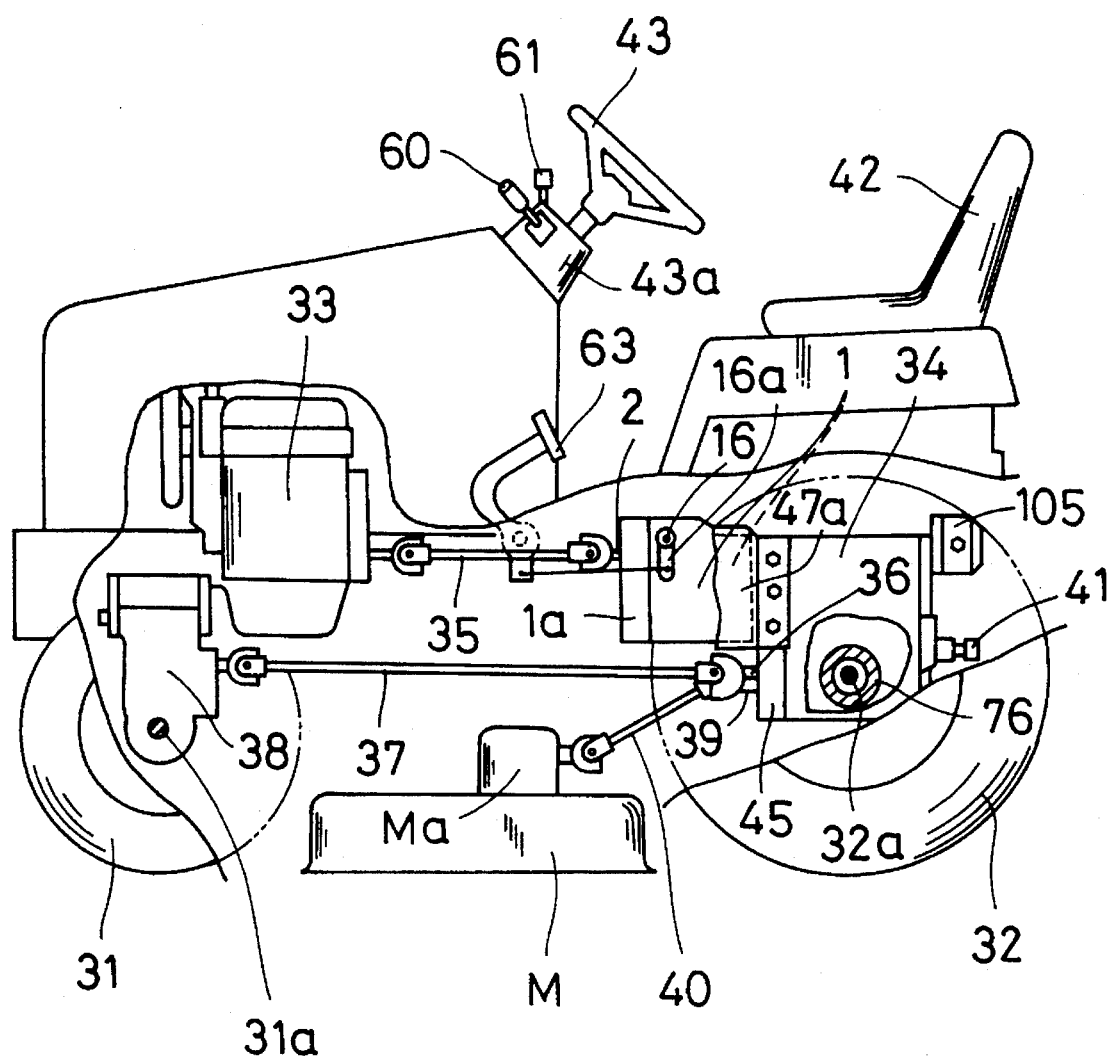
FIG. 2 is a schematic side view, partially cut away, of a mower tractor in which the transmission assembly shown in FIG. 1 is employed.

A mower tractor is shown in FIG. 2 in which a first preferred embodiment of the transmission assembly according to the present invention is employed. The tractor is equipped with a and mount mower M at an underside of the vehicle and between pairs of front wheels 31 and rear wheels 32.

An engine 33 is mounted on a front portion, and a transaxle-type transmission having an axle casing 34 is disposed between left and right rear wheels 32. Left and right rear wheel axles 32a extend sidewards from the axle casing. The transmission assembly according to the present invention includes a transmission casing 1 which is mounted on a front of the axle casing 34. The transmission casing 1 includes a drive shaft 2 which extends forwardly from this casing. Power is transmitted to the drive shaft 2 from the engine 33 through a transmission shaft 35 which extends axially of the vehicle. For driving the front wheels 31, widen required, together with rear wheels 32, a front wheel-driving shaft 36 is provided and extends forwardly from the axle casing 34 at an underside of the transmission casing 1. This shaft 36 transmits power into a front axle casing 38 through a transmission shaft 37. For driving the mower M, a mid-PTO shaft 39 is provided and extends forwardly from the axle casing 34 also at an underside of the transmission casing 1. This mid-PTO shaft 39 transmits power into a gear box Ma for the mower M through a transmission shaft 40. A rear-PTO shaft 41 is also provided for driving an auxiliary implement (not shown) to be drawn by the tractor and extends rearwardly from the axle casing 34. Seat 42 is disposed at an upper position of a rear end portion of the tractor. As is usual, the vehicle is steered by an operator on the seat 42 by means of steering wheel 43 for providing a turn to the left and right front wheels 31.

Figure 3:
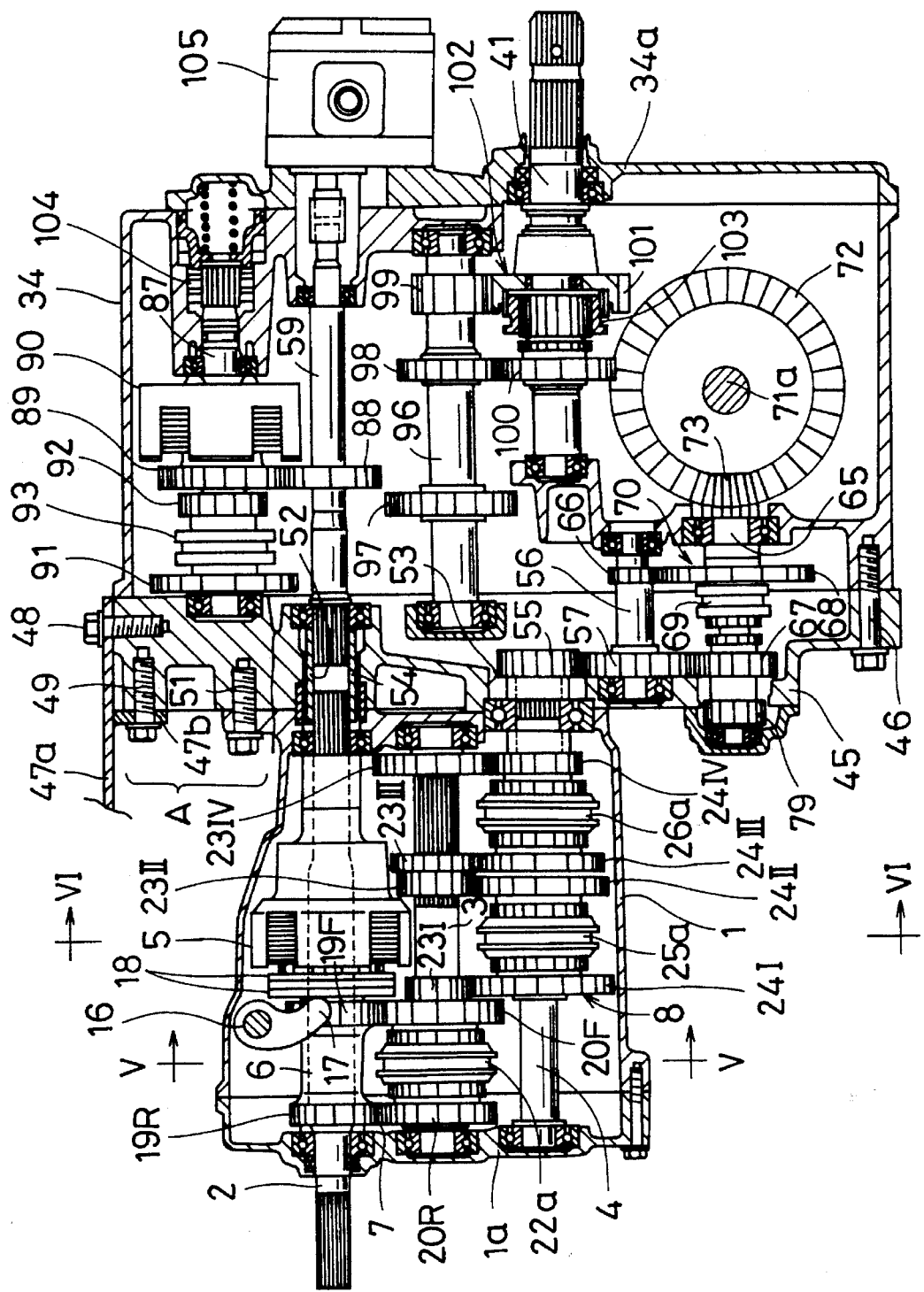
FIG. 3 is a sectional side view, partially developed, of a part of the mower tractor shown in FIG. 2.
Figure 4:
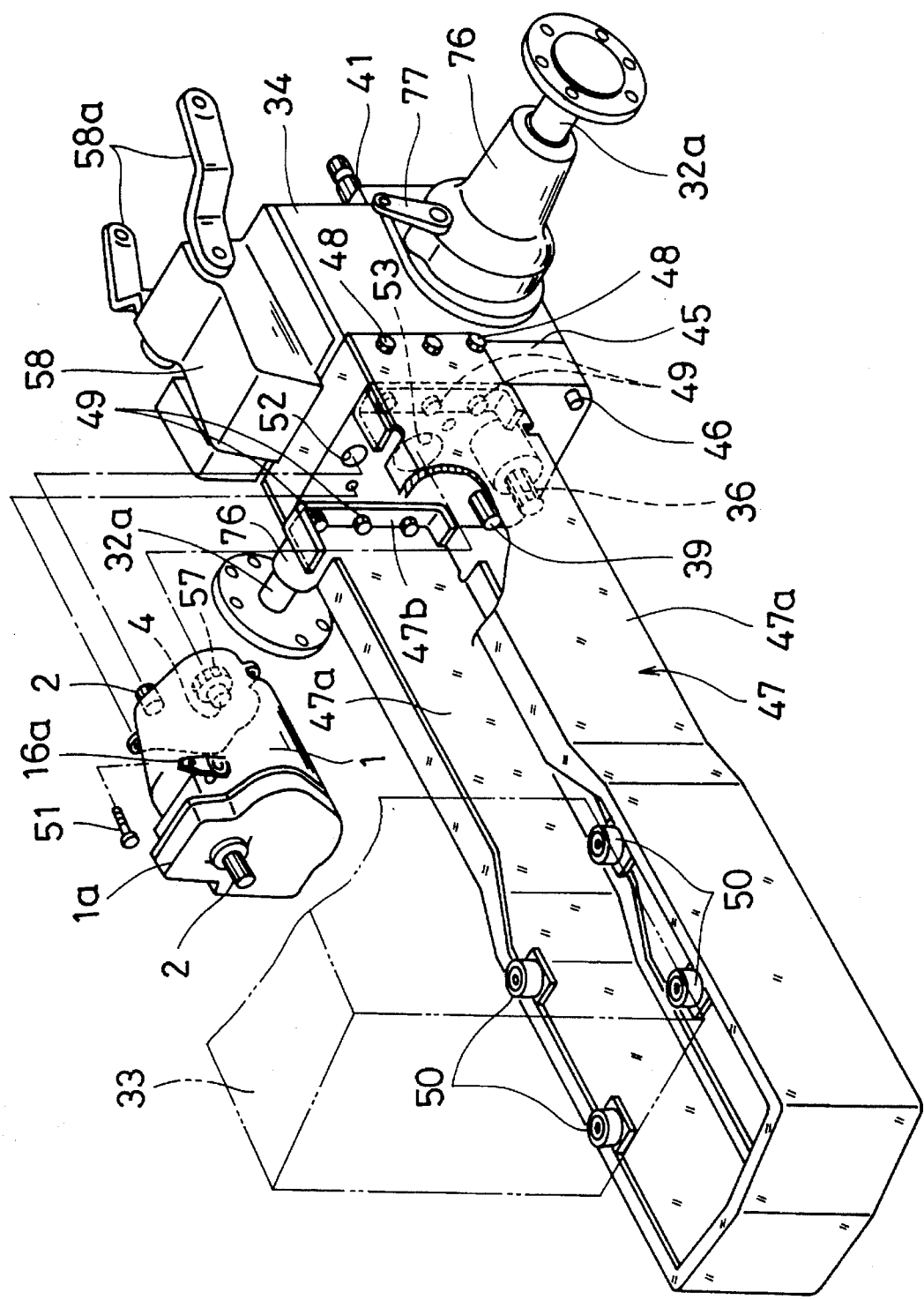
FIG. 4 is a schematic perspective view showing the frame structure in the tractor shown in FIG. 2.

As shown in FIGS. 3 and 4, a cover member 45 of a relatively large thickness is secured to a front of the axle casing 34 using bolts 46. Vehicle frame 47 of the tractor shown is shaped to have a C-letter configuration, elongated along the axial direction of the tractor, including left and right upstanding frame portions 47a which are secured at their rear ends to side end faces of the cover member 45 using laterally extending bolts 48. To the inner surfaces of rear end portions of the left and right upstanding frame portions 47a, left and right plate-shaped frame members 47b are attached by welding and are secured to the cover member 45 using axially extending bolts 49 so as to attain a rigid connection of the vehicle frame 47 to the cover member 45. In FIG. 3, the part designated by character (A) illustrates a horizontal section of the frame 47 and cover member 45. Upper and lower ends of the left and right frame portions 47a include laterally inwardly extending flanges. The vehicle frame 47 includes at its front end portion and at its upper side an engage-mounting portion having four rubber vibration isolators 50. The transmission casing 1 has at its rear end laterally outwardly extending flanges at which this casing 1 is secured to a front of the axle casing 34 using axially extending bolts 51.

An aperture 52 is formed in the cover member 45 at a location corresponding to that of the drive shaft 2. Similarly, another aperture 53 is formed in the cover member 45 which corresponds in location to a speed-change shaft 4 disposed at a low level within the transmission casing 1. The drive shaft 2 extends rearwardly frown the transmission casing 1 and is coupled at an inside of the aperture 52 to a drive shaft 59 of the power take-off line within the axle casing 34 using a coupling 54. Similarly, the speed-change shaft 4 extends rearwardly from the transmission casing 1 and through the aperture 53 into a cavity in the cover member 45. Within the cavity, the change shaft 4 carries an output gear 55 which meshes with a larger gear 57, which is fixedly mounted to a drive shaft 56 of the vehicle drive power transmission line within the axle casing 34, so that the drive shaft 56 is driven to rotate by the speed-change shaft 4 at a reduced speed of rotation. In FIG. 4, numeral 58 designates a hydraulic lift mechanism, having a pair of left and right lift arms 58a, which are disposed on an upper surface of the axle casing 34 for lifting and lowering a auxiliary implement (not shown) to be drawn by the tractor and to be driven by the rear-PTO shaft 41.

Figure 1:
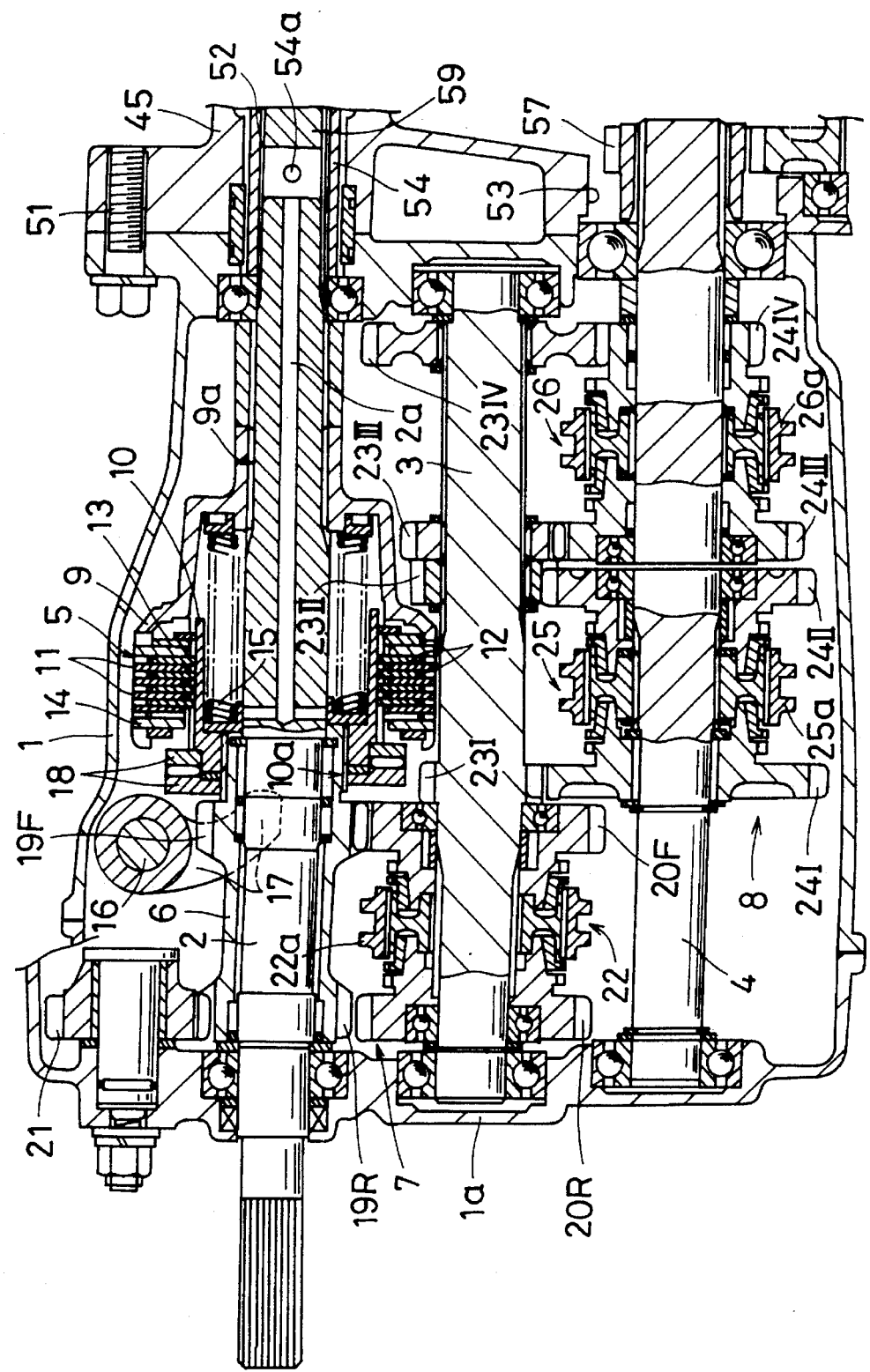
FIG. 1 is a sectional side view of a first preferred embodiment of the vehicle transmission assembly according to the present invention.
Figure 5:
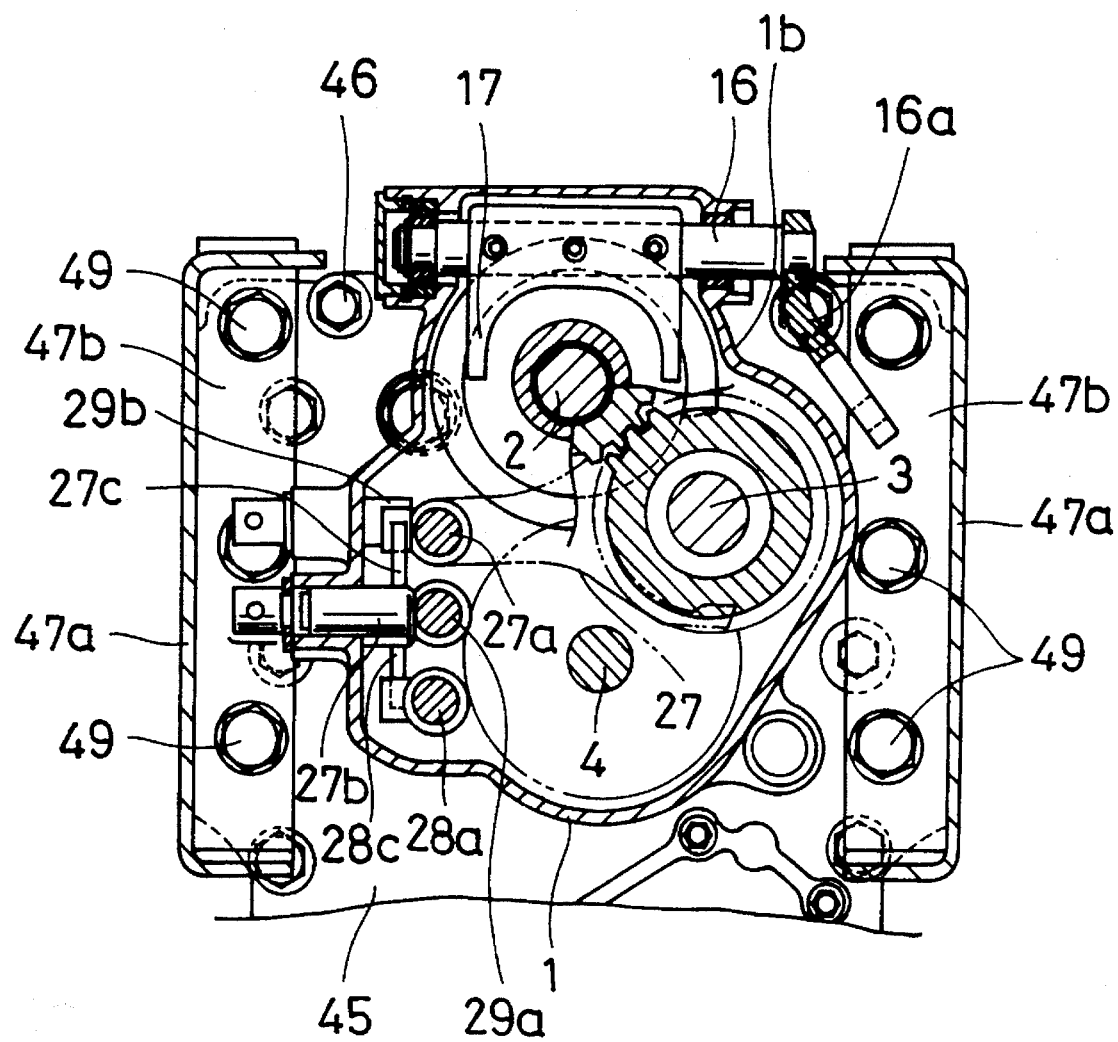
FIG. 5 is a sectional view taken along line V—V of FIG. 3.
Figure 6:
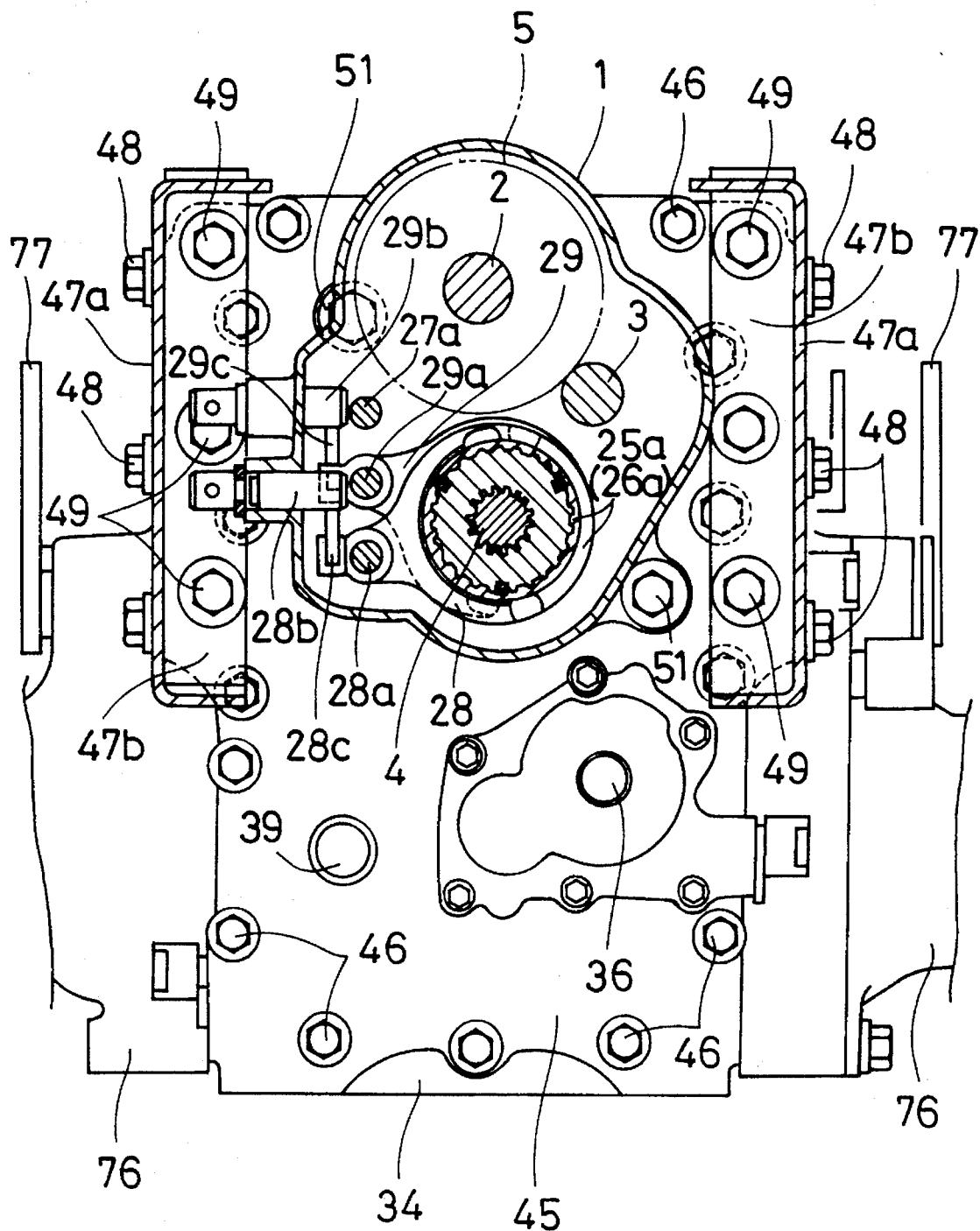
FIG. 6 is a sectional view taken along line VI—VI of FIG. 3.

As shown in FIGS. 1 and 3, drive shaft 2, intermediate shaft 3 and speed-change shaft 4 are journalled in the transmission casing 1 and extend axially of the casing. As shown in FIGS. 5 and 6, the drive shaft 2 of a high level and the change shaft 4 of a low level are located substantially in the middle of the transmission casing 1, as viewed in a direction across this casing, whereas the intermediate shaft 3 of a mid level between the drive shaft 2 and change shaft 4 is located aside in a direction across the casing 1. As shown in FIGS. 1 and 3, a clutch 5 is disposed on the drive shaft 2 at an axially mid portion of this shaft, and a hollow shaft 6 is rotatably mounted on the drive shaft 2 at a front side of the clutch and is adapted to be driven to rotate by the drive shaft 2 through the clutch 5. A first mechanical speed-change mechanism 7 is disposed between the hollow shaft 6 and intermediate shaft 3, and a second mechanical speed-change mechanism 8 is disposed between the intermediate shaft 3 and speed-change shaft 4 at a rearer side of the first mechanism 7.

As shown in FIG. 1, the clutch 5 shown is fashioned to a multidisc wet type. That is, a first cylindrical member 9 is fixedly mounted on the drive shaft 2 using a spline connection 9a and a second cylindrical member 10 having an outer diameter smaller than that of the first cylindrical member is slidably but non-rotatably mounted on the intermediate shaft 3 using a spline fitting 10a and extends into the first cylindrical member 9. A plurality of first and second frictional discs or elements 11 and 12 which are arranged alternately are slidably but non-rotatably supported respectively by the first cylindrical member 9 and by the second cylindrical member 10. A pressure member or ring 13 is supported by the slidable second cylindrical member 10 at a rear side of the frictional elements 11 and 12, and a reaction member or ring 14 is supported by the non-slidable first cylindrical member 9 at a front side of the frictional elements 11 and 12. These rings 13 and 114 are supported such that, when the second cylindrical member 10 is slidingly moved into a forward direction, the pressure ring 13 presses the frictional elements 11 and 12 against the reaction ring 14 so as to cause a frictional engagement between these elements and to thereby engage the clutch 5. A plurality of coil springs 15 are disposed around the drive shaft 2 and are received at their rear ends by the first cylindrical member 9. These springs 15 engage at their front ends the second cylindrical member 10 so as to bias this member 10 to move forwards. Consequently, the clutch 5 is kept in its engaged condition by coil springs 15. For disengaging the clutch 5, a rockable release yoke 17 is carried by a laterally extending control shaft 16 and engages the second cylindrical member 10 through a thrust bearing means comprising a pair of rings 18 and a thrust bearing disposed therebetween. The upper half of clutch 5 shown in FIG. 1 illustrates an engaged condition of this clutch 5, while the lower half illustrates a disengaged condition of the clutch where the second cylindrical member 10 has been pushed to move rearwards by the yoke 17 so that the pressure ring 13 has been displaced rearward so as to release engagement between the frictional elements 11 and 12. Lubricating and cooling oil is supplied to the frictional elements through an oil passage 2a formed in the drive shaft 2. This oil passage 2a is in fluid communication with an oil passage (not shown) in the cover member 45 through a perforation 54a formed in the coupling 54. Alternatively, the oil passage 2a may be communicated to a lubricant passage (not shown) in the shaft 59 through the inside of coupling 54.

As also shown in FIG. 1, the first mechanical speed-change mechanism 7 comprises two gears 19F and 19R, which are formed integral with the hollow shaft 6, and two gears 20F and 20R which are rotatably mounted on the intermediate shaft 3. Of these gears, gears 19F and 20F are meshed directly with each other. Gears 19R and 20R are meshed through an idler gear 21 which is rotatably mounted on a support shaft secured to a front end cover 1a of the transmission casing 1. A synchronous double clutch 22 having a shifter sleeve 22a is disposed on the intermediate shaft 3 and between the gears 20F and 20R. The first mechanical speed-change mechanism 7 is fashioned to a directional change mechanism which provides to the intermediate shaft 3 a forward directional rotation, when gear 20F is coupled to shaft 3 by a rearward shift of the shifter sleeve 22a, and a backward directional rotational when gear 20R is coupled to shaft 3 by a forward shift of the shifter sleeve 22a.

As shown in FIG. 1, the second mechanical speed-change mechanism 8 comprises four gears 23I, 23II, 23III and 23IV, which are fixedly mounted on the intermediate shaft 3, and four gears 24I, 24II, 24III, and 24IV which are fixedly mounted on the speed-change shaft 4. Of these gears, corresponding two gears are meshed, respectively, as shown. Of the gears 23I to 23IV of the intermediate shaft 3, smaller two gears 23I and 23II are disposed at axially fronter and rearer sides of a diameter-enlarged portion in the first cylindrical member 9 of the clutch 5 so as to prevent an interference of the gears with the cylindrical member 9. The largest gear 23IV is disposed on a rear end portion of the intermediate shaft 3, which portion is axially spaced from the cylindrical member 9, so that this gear 23IV will cause no problem of interference. On the change shaft 4, synchronous double clutches 25 and 26 having shifter sleeves 25a and 26a are disposed respectively between gears 21I and 24II and between gears 24III and 24IV. The second mechanical speed-change mechanism 8 is fashioned to a four-stage change mechanism which provides first to fourth speed ratios to the change shaft 4 by selectively shifting shifter sleeves 25a and 26a so as to couple each of the gears 24I to 24IV selectively to the shaft 4.

For shifting the shifter sleeves 22a, 25a and 26a for the first and second mechanical speed-change mechanisms 7 and 8, three support shafts 27a, 28a and 29a extending axially of the transmission casing 1 are fixedly disposed within the casing 1, as shown in FIGS. 5 and 6, sidewards of the intermediate and change shafts 3 and 4 and at a side opposite to the intermediate shaft. Shifter forks 27, 28 and 29 are slidably supported by these support shafts 27a, 28a and 29a and engage respectively the shifter sleeves 22a, 25a and 26a. Three rotatable control shafts 27b, 28b and 29b are provided and extend laterally through a sidewall of the transmission casing 1. These control shafts carry respectively at their inner ends shifter arms 27c, 28c and 29c which engage shifter forks 27, 28 and 29, respectively. Control shaft 27b and control shafts 28b and 29b are adapted to be rotationally displaced respectively using directional change lever 60 and change lever 61 which are provided, as shown in FIG. 2, to a steering column 43a. By such rotational displacements of the control shafts 27b, 28b and 29b, shifter forks 27, 28 and 29 are slidingly moved respectively along the support shafts 27a, 28a and 29a so as to slidingly shift the respective shifter sleeves 22a, 25a and 26a.

As shown in FIG. 5, the control shaft 16 carrying the release york 17 for disengaging the clutch 5 is disposed at an uppermost location within the transmission casing 1 and extends at its one end outwardly through a sidewall 1b of the casing 1. A clutch arm 16a is attached to the outer end of this control shaft 16 and is operatively connected to a clutch pedal 63, as shown in FIG. 2, which is disposed at one side of the tractor at a position before and below the seat 42. When the pedal 63 is operated downwards, the clutch 5 is disengaged through a half-engaged condition.

Figure 7:
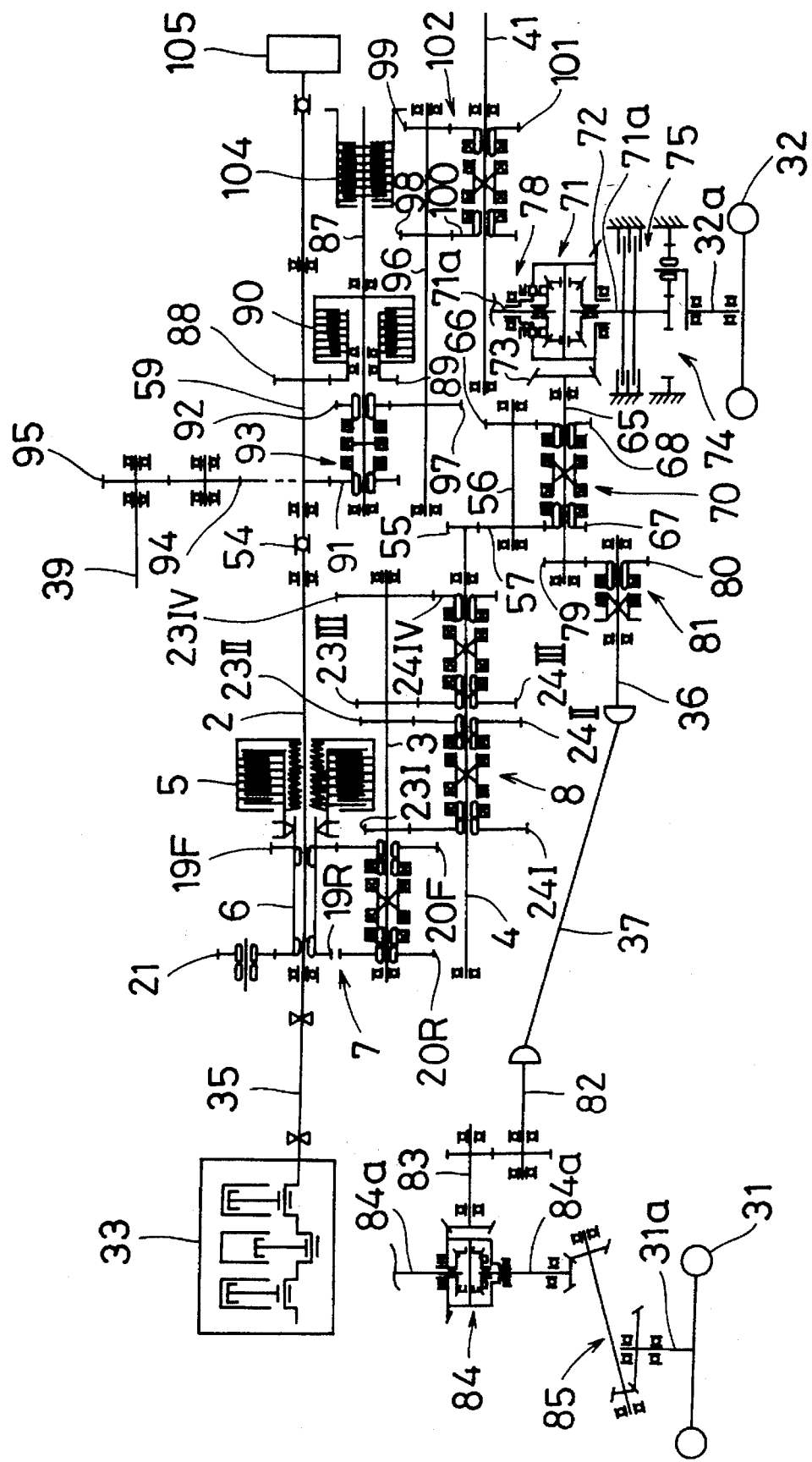
FIG. 7 is a schematic diagram, partially omitted, showing transmission mechanisms employed in the tractor shown in FIG. 2.

The transmission mechanisms disposed within the axle casing 34 are substantially same as the ones disclosed in each of U.S. Pat. No. 4,579,183 and JP, U No. 63-179239 referred to before. As shown in FIGS. 3 and 7, the vehicle drive power transmission line includes a speed-change shaft 65 which extends parallel to the drive shaft 56 referred to before. One more gear 66 other than the gear 57 referred to before is also fixedly mounted on the drive shaft 56, and two gears 67 and 68 are rotatably mounted on the change shaft 65. Gears 57 and 67 and gears 66 and 68 are meshed respectively, as shown. A shifter sleeve 69 is disposed between gears 67 and 68 on the change shaft 65 for selectively coupling one of these gears to the shaft 65. By this, an auxiliary speed-change transmission 70 is provided which co-operates with the speed-change mechanisms 7 and 8, constituting a main speed-change transmission, within the transmission casing 1 in varying the vehicle speed. A differential gearing 71 is disposed behind the change shaft 65 at a lower location within the axle casing 34. This gearing 71 has an input bevel gear 72 which meshes with a bevel pinion 73 fixedly mounted on a rear end portion of the change shaft 65. Left and right output shafts 71a of the differential gearing 71 are drivingly connected, as shown in FIG. 7, to the left and right rear wheel axles 32a through left and right final speed reduction planetary gearings 74. A brake 75 is provided to each of the output shafts 71a. The brakes 75 and reduction gearings 74 are disposed within left and right axle housings 76 which are secured, as shown in FIGS. 2, 4 and 6, to both sides of the axle casing 34. In FIGS. 4 and 6, numeral 77 designates brake arms for operating the brakes 75. In FIG. 7, numeral 78 designates a differential-locking clutch provided to the differential gearing 71.

As shown in FIGS. 3 and 7, a gear 79 is fixedly mounted on a front end portion of the change shaft 65 and meshes with a gear 80 which is rotatably mounted on the front wheel-driving shaft 36 referred to before. A front wheel-driving clutch 81 is disposed on the shaft 36 for selectively coupling gear 80 to this shaft. As shown in FIG. 7, the aforementioned transmission shaft 37 which is connected at its rear end to the front wheel-driving shaft 36 is connected at its front end to an input shaft 82 of the front axle casing 38 (FIG. 2). The input shaft 82 is adapted to transmit power via an intermediate shaft 83 to a front wheel differential gearing 84, and left and right output shafts 84a of this differential gearing are connected to left and right front wheel axles 31a through left and right two-stage reduction gearings 85 comprising bevel gears.

As shown in FIGS. 3 and 7, the power take-off line within the axle casing 34 includes a clutch shaft 87 which is disposed below the drive shaft 59 referred to before (In FIG. 3, the vertical section of axle casing 34 is shown in a developed illustration so that clutch shaft 87 is seen above the drive shaft 59). A gear 88 is fixedly mounted on the drive shaft 59, and a gear 89 meshing with the gear 88 is rotatably mounted on the clutch shaft 87 and is adapted to be coupled selectively to this clutch shaft by a fluid-actuated PTO-clutch 90 disposed on the shaft 87. Two gears 91 and 92 are rotatably mounted on the clutch shaft 87 at a portion before PTO-clutch 90. A PTO-exchanging clutch 93 operable to couple each of the gears 91 and 92 to clutch shaft 87 is disposed between these two gears. Gear 91 is meshed via an intermediate gear 94 with a gear 95 which is fixedly mounted on the mid-PTO shaft 39 referred to before. An intermediate shaft 96 is disposed between the clutch shaft 87 and rear-PTO shaft 41, and gear 92 is meshed with a gear 97 which is fixedly mounted on this intermediate shaft. A rear-PTO speed-change mechanism 102 is disposed between the intermediate shaft 96 and rear-PTO shaft 41 and comprises two gears 98 and 99, which are fixedly mounted on the intermediate shaft 96, and two gears 100 and 101 which are rotatably mounted on the rear-PTO shaft 41 and mesh respectively with gears 98 and 99. Gears 100 and 101 are adapted to be coupled selectively to the PTO shaft 41 by a shifter sleeve 103 which is disposed between these gears. A brake 104 is provided which is operable to brake the clutch shaft 87 in a disengaged condition of the PTO-clutch 90. A hydraulic pump 105 driven by the drive shaft 59 is disposed on a rear surface of a rear end cover 34a of the axle casing 34 and is used for supplying fluid to the fluid-actuated PTO-clutch.

The mower tractor shown in FIG. 2 is used for various working purposes such as mowing operation using the mower M, simultaneous grass-collecting operation using a grass collector (not shown) to be drawn by the tractor and to be driven by the rear-PTO shaft 41, tilling operation using a rotary tiller (not shown) also to be drawn by the tractor and to be driven by the PTO shaft 41) and the like. A stationary working operation such as spraying operation using a sprayer to be driven by the rear-PTO shaft 41 can also be carried out at a condition where the tractor remains unmoved.

Figure 8:
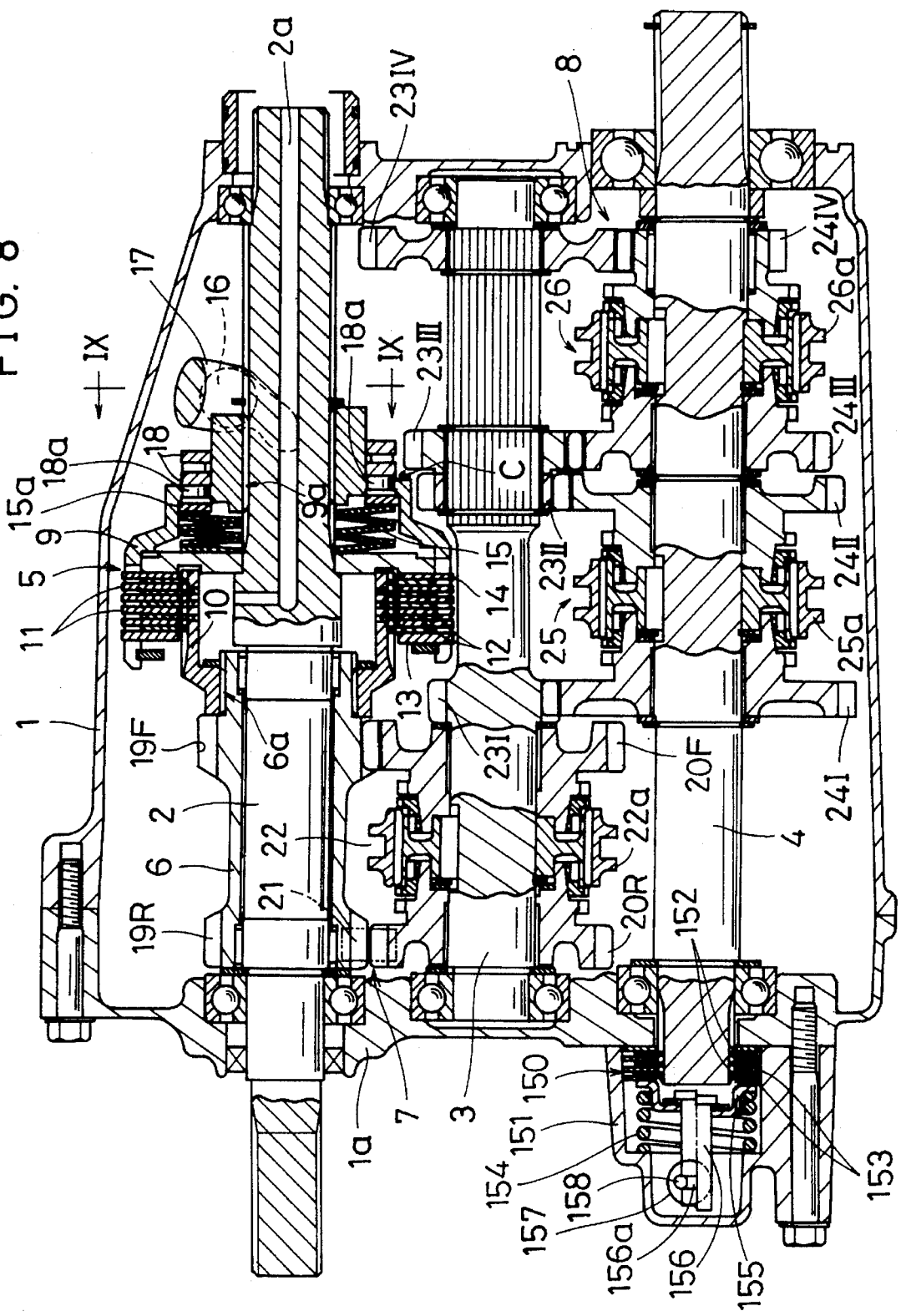
FIG. 8 is a sectional view similar to FIG. 1 but slowing a second preferred embodiment of the transmission assembly according to the present invention.
Figure 9:
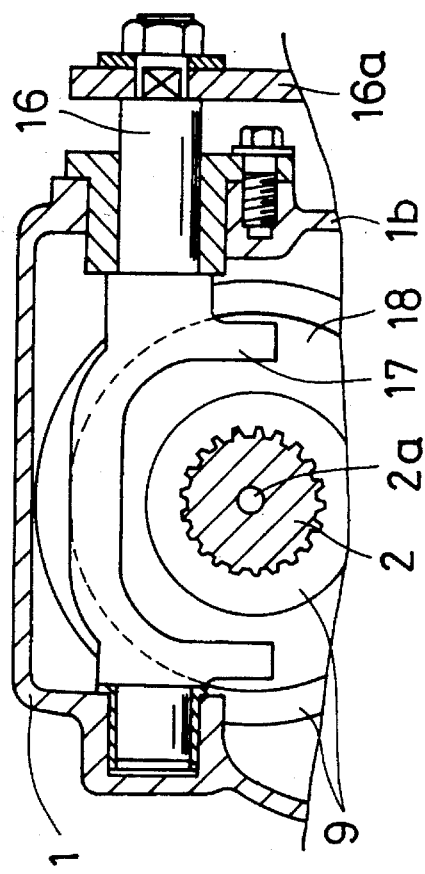
FIG. 9 is a sectional view taken along line IX—IX of FIG. 8.
Figure 10:
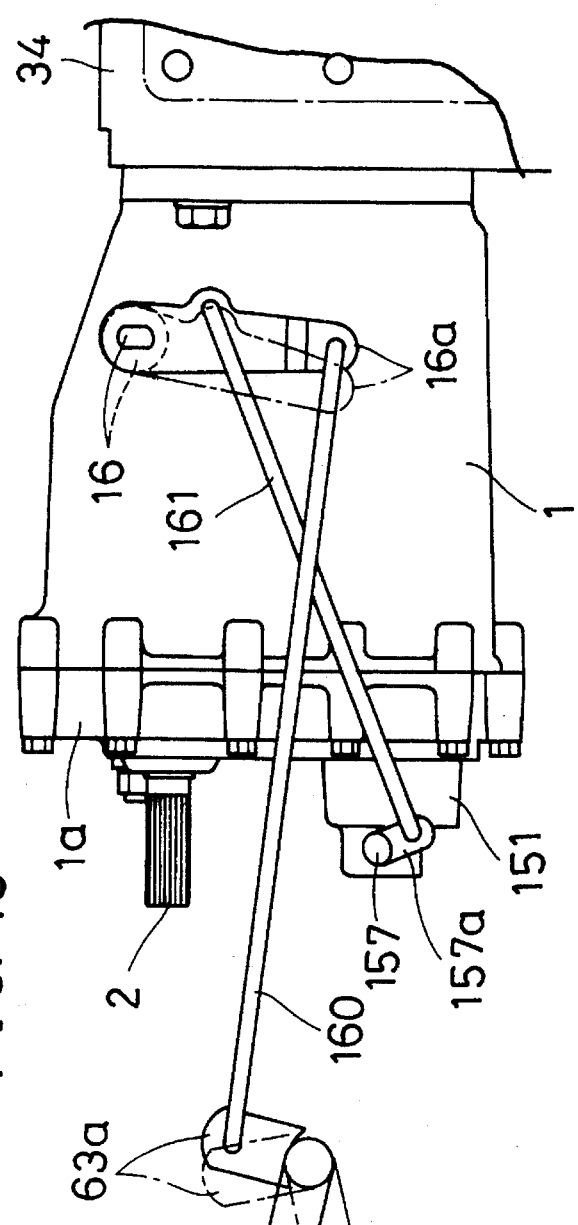
FIG. 10 is a schematic side view showing a clutch and brake-operating mechanism provided in a mower tractor in which the transmission assembly shown in FIG. 8 is employed.
Figure 10:
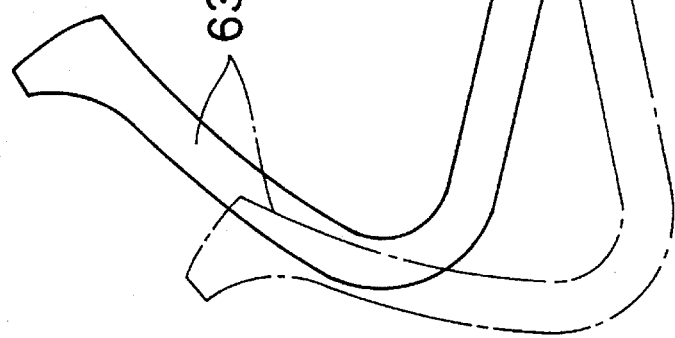

In FIGS. 8 to 10, there is shown a second preferred embodiment of the vehicle transmission assembly according to the present invention. In these figures, numerals used for designating various parts of the first embodiment are used again for designating like parts.

As shown in FIG. 8, clutch 5 disposed on the drive shaft 2 at an axially mid portion thereof comprises a first cylindrical member 9, which is slidably but non-rotatably mounted on the drive shaft 2 using a spline fitting 9a, and a second cylindrical member 10 which is fixedly mounted on the hollow shaft 6 using a spline connection 6a. As is the case in the first embodiment, a plurality of alternately arranged first and second frictional elements 11 and 12 are slidably but non-rotatably supported respectively by the first cylindrical member 9 and by the second cylindrical member 10. In the second embodiment, a pressure ring 13 is supported by the slidable first cylindrical member 9 while a reaction ring 14 is supported by the non-slidable second cylindrical member 10. A plurality of leaf springs 15 are provided within the first cylindrical member 9 and on the drive shaft 2 such that they bias the member 9 through a spring-receiving ring 15a rearwards so as to displace the pressure ring 13 rearwards and to thereby cause a frictional engagement between the first and second frictional elements 11 and 12, as shown in FIG. 8 with respect to a lower half of the clutch 5.

As shown in FIGS. 8 and 9, an upside-down U-shaped release yoke 17 is carried by a rotatable control shaft 16 which has one end extending outwardly from the transmission casing 1 through a sidewall 1b of this casing. A clutch arm 16a is attached to the outer end of control shaft 16. Similarly to the case of the first embodiment, the release yoke 17 is adapted to engage the slidable cylindrical member 9 through a thrust bearing means comprising a pair of plate members 18. In the second embodiment, however, the clutch mechanism includes a plurality of slidable push pins 18a which extend through intermittently arranged bores in a vertical wall portion of the first cylindrical member 9 and engage at their front ends the spring-receiving ring 15a and at their rear ends one of the thrust bearing rings 18 under the biasing of leaf springs 15. It is designed that there remains at a full engaged condition of clutch 5, shown in FIG. 8 with respect to a lower half of this clutch, a small clearance (C) between the first cylindrical member 9 and the thrust bearing ring 18 of this side.

Consequently, when the release yoke 17 is rockingly removed from a clutch-engaged condition so as to disengage the clutch 5, the leaf springs 15 are compressed by some degree through the push pins 18a and spring-receiving ring 15a and the ring 15a is once moved apart from the cylidrical member 9 so that a disengaged condition of the clutch is achieved. Then the first cylindrical member 9 is moved towards the position shown in FIG. 8 with respect to an upper half of the clutch 5 where the clutch is kept disengaged. It is thus seen that a disengaged condition of the clutch 5 is attained already before the cylindrical member 9 is moved. In the full engaged condition of clutch 5, a large torque is transmitted through the spline fitting 9a between the drive shaft 2 and first cylindrical member 9 so that there is a relatively large resistance against a moving operation of the cylindrical member 9 by means of yoke 17. Movement of the cylindrical member 9 which starts from a disengaged condition (or half-engaged condition) of the clutch 5 will reduce operating force required for disengaging the clutch 5.

As shown in FIG. 8, a brake 150 is provided for braking the speed-change shaft 4 at a disengaged condition of the clutch 5. This brake is housed within a brake casing 151, attached to a front surface of the front end cover 1a of transmission casing 1, into which a front end portion of the change shaft 4 extends. Brake 150 comprises a plurality of alternately arranged first and second frictional elements 152 and 153 which are slidably but non-rotatably supported respectively by the change shaft 4 and by the brake casing 151. A coil spring 154 is provided which is operable to bias the frictional elements 152 and 153 through an annular member 155 to move towards the end cover 1a and to thereby cause a frictional engagement between the first and second frictional elements. A slidable operating pin 156 extends through the annular member 155 and has a head which is engageable with a rear face of the annular member through a washer. A rotatable brake control shaft 157 extends laterally through a sidewall of the brake casing 151 and carries an eccentric pin 158 which is inserted at its free end into a recess 156a in the operating pin 156. When the control shaft 157 is rotated clockwise, as viewed in FIG. 8, the eccentric pin 158 is displaced rearwards so as to slidingly displace the operating pin 150 rearwards.

FIG. 10 illustrates a clutch and brake-operating mechanism provided in a mower tractor in which the transmission assembly shown in FIG. 8 is employed. Similarly to the case of the first embodiment, the clutch 5 (FIG. 8) is operated using a clutch pedal 63. A pedal arm 63a of this pedal is connected to the clutch arm 16a for controlling the clutch through a control rod 160 such that, when the pedal 63 is trod down to the position shown in phantom in FIG. 10, the clutch arm 16a is rockingly moved to the clutch-disengaging position shown also in phantom in FIG. 10. A brake arm 157a is attached to an outer end of the brake control shaft 157 and is connected to a mid portion of the clutch arm 16a through a control rod 161 such that, when the clutch arm 16a is moved from the clutch-engaging position towards the clutch-disengaging position, the brake arm 157a is rockingly moved so as to rotate the brake control shaft 157 clockwise, as viewed in FIG. 10 and also in FIG. 8.

In FIG. 8, an upper half of the brake 150 is illustrated in its operated condition while a lower half is illustrated in the non-operated condition. At a condition where the clutch pedal 63 shown in FIG. 10 is kept in its non-operated position, the eccentric pin 158 is kept in position stop that the operating pin 156 is kept at the position shown in FIG. 8 with respect to a lower half of this pin 156 and the annular member 155 is kept at the position, shown in FIG. 8 with respect to a lower half of this member 155, where the annular member is kept apart from the frictional elements 152 and 153 against the biasing force of spring 154 so that the brake 150 is kept in its non-operated condition. When the pedal 63 is trod down so as to disengage the clutch 5, the brake control shaft 157 is rotated clockwise, as viewed in FIG. 8, so as to displace the eccentric pin 158 rearwards to the position shown in FIG. 8 and, therefore, the operating pin 156 to the position shown in FIG. 8 with respect to an upper half of this pin 156. It is designed that the operating pin 156 at this position allows the spring 154 to bias the frictional elements 152 and 153 through the annular member 155 so that a frictional engagement between the elements 152 and 153 is attained. Consequently, the brake is operated at the disengaged condition of clutch 5 so as to brake the change shaft 4.

Even at a condition where the clutch 5 is disengaged, the hollow shaft 6 may be rotated due to a drag effect of oil that lubricant oil accompanying the rotating frictional elements 11 of the driving side will cause rotation of the frictional elements 12 of the driven side. An unexpected start of the vehicle due to the drag effect of oil from a parked condition where the clutch 5 is disengaged will be well prevented by the brake 150. The capacity of brake 150 is predetermined relatively small only enough to prevent the rotation of change shaft 4 due to such drag effect so that, widen this brake is operated during a travel of the vehicle by a disengaging operation of clutch 5 before a speed-changing operation, the brake is slippingly operated whereby the vehicle keeps running. In such speed-changing operation, the brake 150 still allows a free rotation of the rotating members of the driving sides of respective mechanical speed-change mechanisms 7 and 8 so that synchronous rotation at the respective synchronous clutches 22, 25 and 26 shown are attained promptly.

The other parts of the second embodiment are constructed similarly to the corresponding parts of the first embodiment.

While preferred embodiments of the invention have been described, it will be appreciated that various modifications and changes may be made without departing from the spirit and scope of the appended claims.

We claim:

1. A vehicle transmission assembly comprising:
    a transmission casing;
    a drive shaft which is disposed within said transmission casing at a high level and extends axially of said casing, said drive shaft extending forwardly and rearwardly from said transmission casing;
    a speed-change shaft which is disposed within said transmission casing at a low level and extends axially of said casing, said speed-change shaft extending rearwardly from said transmission casing;
    an intermediate shaft which is disposed within said transmission casing at an intermediate level between said drive shaft and said speed-change shaft and which extends axially of said casing, said intermediate shaft being located aside in a direction across said transmission casing;
    a clutch which is disposed on said drive shaft at an axial mid portion of said drive shaft;

a hollow shaft which is rotatably mounted on said drive shaft at one axial side of said clutch such that said hollow shaft is driven to rotate by said drive shaft through said clutch;

a first mechanical speed-change mechanism which is disposed between said hollow shaft and said intermediate shaft and comprises plural speed-change gear trains including plural driving gears mounted on said hollow shaft and plural driven gears mounted on said intermediate shaft, said intermediate shaft being driven to rotate exclusively by said hollow shaft through said first mechanical speed-change mechanism; and a second mechanical speed-change mechanism which is disposed between said intermediate shaft and said speed-change shaft at a location axially apart from said first speed-change mechanism and comprises plural speed-change gear trains including plural driving gears mounted on said intermediate shaft and plural driven gears mounted on said speed-change shaft, said speed-change shaft being driven to rotate exclusively by said intermediate shaft through said second mechanical speed-change mechanism.

2. The vehicle transmission assembly as set forth in claim 1, wherein a shaft means (22a) for said first mechanical speed-change mechanism (7) is disposed oil said intermediate shaft (3) and shift means (25a, 26a) for said second mechanical speed-change mechanism (8) is disposed on said speed-change shaft (4), and wherein shifter forks (27, 28, 29) engaging said shift means are supported respectively by support shafts (27a, 28a, 29a) which are disposed sidewards of said intermediate and speed-change shafts (3, 4) within said transmission casing (1) and extend axially of said casing.

3. The vehicle transmission assembly as set forth in claim 2, wherein said support shafts (27a, 28a, 29a) are located aside in a direction across said transmission casing (1) such that said support shafts are disposed opposite to said intermediate shaft (3).

4. The vehicle transmission assembly as set forth in claim 1, wherein said clutch (5) is composed of a frictional clutch which comprises:

a first cylindrical member (9) mounted co-rotatably on said drive shaft (2);

a second cylindrical member (10) mounted co-rotatably on said hollow shaft (6), one to said first and second cylindrical members being supported slidably;

a plurality of first frictional elements (11) supported slidably but non-rotatably by said first cylindrical member;

a plurality of second frictional elements (12) supported slidably but non-rotatably by said second cylindrical member, said first and second frictional elements being disposed alternately;

a pressure member (13) supported by said one cylidrical member such that when the said cylindrical member is slidingly moved towards one direction said pressure member presses said first and second frictional elements so as to cause a frictional engagement between said first and second frictional elements;

spring means (15) for biasing said one cylindrical member to move towards said one direction; and a movable clutch-disengaging member (17) for operating said one cylindrical member to move towards the other direction and to thereby cause a disengagement between said first and second frictional elements.

5. The vehicle transmission assembly as set forth in claim 4, wherein said clutch-disengaging member is composed of a yoke (17) which is carried by a rotatable control shaft (16) and is adapted to engage said one cylindrical member (9; 10) through a thrust-bearing means (18), said control shaft extending through a sidewall (1b) of said transmission casing (1).

6. The vehicle transmission assembly as set forth in claim 5, wherein slidable push means (18a) supported by said one cylindrical member (9) is disposed between said spring means (15) and said thrust-bearing means (18) such that when said yoke (17) is moved so as to move said one cylindrical member towards said one direction said thrust-bearing means pushes said spring means through said push means so as to reduce the biasing force applied to said one cylindrical member by said spring means, said thrust-bearing means (18) being disposed such that a clearance (C) exists between said thrust-bearing means (18) and said one cylindrical member (9) at a full engaged condition of said clutch (5).

7. The vehicle transmission assembly as set forth in claim 4, wherein a brake (150) for braking said speed-change shaft (4) is provided and is operatively connected to a control mechanism (16a, 63, 160) for disengaging said clutch (5) such that said brake is actuated when said clutch is disengaged.

8. The vehicle transmission assembly as claimed in claim 1, wherein one of said first and second mechanical speed-change mechanisms (7, 8) is of a direction-reversing type which is operable to selectively reverse its input rotation so as to selectively provide a forward directional output rotation and a backward directional output rotation, whereas the other mechanical speed-change mechanism is of a unidirectional type which is operable to change its input rotational speed into multiple output rotational speeds.

* * * * *